(12) United States Patent
Sugaya

(10) Patent No.: US 12,313,954 B2
(45) Date of Patent: *May 27, 2025

(54) ELECTRONIC APPARATUS AND METHOD FOR PERFORMING CONTROL BASED ON DETECTION OF USER'S SIGHT LINE

(71) Applicant: CANON KABUSHIKI KAISHA, Tokyo (JP)

(72) Inventor: Kazuki Sugaya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,386

(22) Filed: Mar. 25, 2024

(65) Prior Publication Data

US 2024/0231189 A1 Jul. 11, 2024

Related U.S. Application Data

(63) Continuation of application No. 17/115,156, filed on Dec. 8, 2020, now Pat. No. 11,966,146.

(30) Foreign Application Priority Data

Dec. 10, 2019 (JP) ................................ 2019-223003

(51) Int. Cl.
*G03B 13/02* (2021.01)
*F41G 1/38* (2006.01)
*G06F 3/01* (2006.01)

(52) U.S. Cl.
CPC ............... *G03B 13/02* (2013.01); *F41G 1/38* (2013.01); *G06F 3/013* (2013.01)

(58) Field of Classification Search
None
See application file for complete search history.

(56) References Cited

U.S. PATENT DOCUMENTS 5,485,239 A 1/1996 Ohsawa
5,694,623 A 12/1997 Akashi
(Continued)

FOREIGN PATENT DOCUMENTS

JP H05191686 A 7/1993
JP 07-319031 A 12/1995
(Continued)

OTHER PUBLICATIONS

The above Foreign Patent Documents were cited in a Japanese Office Action that issued on Oct. 28, 2024, which is enclosed, with a machine translation, that issued in the corresponding Japanese Patent Application No. 2024-015047.

(Continued)

*Primary Examiner* — Rodney E Fuller
(74) *Attorney, Agent, or Firm* — Cowan, Liebowitz & Latman, P.C.

(57) ABSTRACT

An electronic apparatus comprises an eye approach detection unit configured to detect an objective approaching to a finder, a sight line detection unit configured to detect a sight line position to a display unit that is arranged in the finder, and a control unit configured to perform control to drive the sight line detection unit and stop driving the approach detection unit when it is detected by the approach detection unit that an objective has been approached to the finder, wherein the control unit performs control to, based on a detection result of the sight line detection unit, drive the approach detection unit from a state in which a driving of the approach detection unit is stopped, and stop driving the sight line detection unit while driving the approach detection unit.

19 Claims, 7 Drawing Sheets

(56) References Cited

U.S. PATENT DOCUMENTS

| | | |
|---|---|---|
| 11,966,146 B2* | 4/2024 | Sugaya .................. G06F 3/013 |
| 2018/0227496 A1 | 8/2018 | Takahashi |
| 2019/0014256 A1 | 1/2019 | Ogawa |

FOREIGN PATENT DOCUMENTS

| | | |
|---|---|---|
| JP | H1096849 A | 4/1998 |
| JP | 2003-198889 A | 7/2003 |
| JP | 2004-120005 A | 4/2004 |
| JP | 2004-165934 A | 6/2004 |
| JP | 2015-022700 A | 2/2015 |
| JP | 2017-120272 A | 7/2017 |
| JP | 2018-037861 A | 3/2018 |

OTHER PUBLICATIONS

The above U.S. Patent document #1, U.S. Patent Publication #1, and Foreign Patent Documents #3-6 were cited in a Dec. 12, 2022 Chinese Office Action, which is enclosed with an English Translation, that issued in Chinese Patent Application No. 202011451483.9.

* cited by examiner

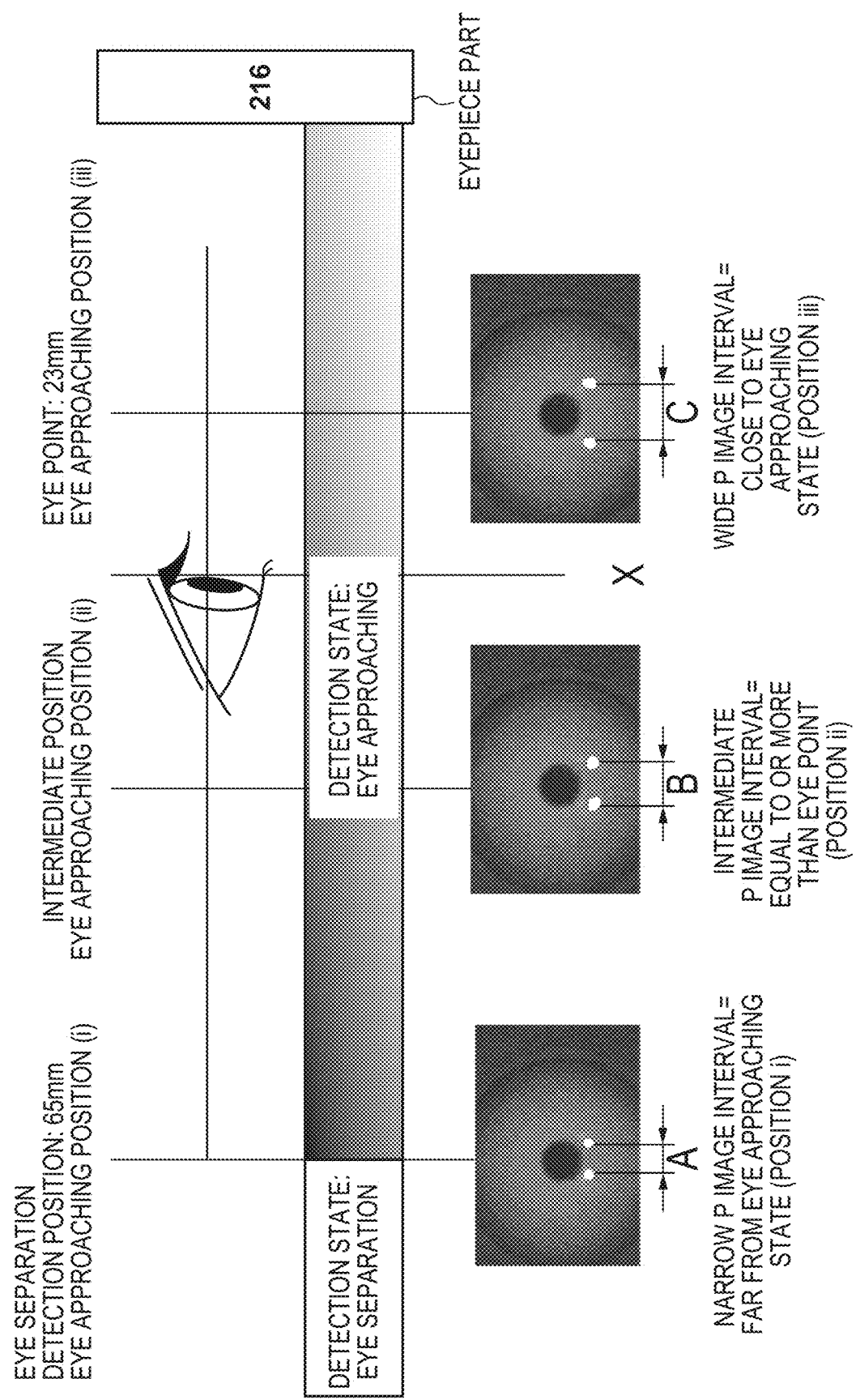

ELECTRONIC APPARATUS AND METHOD FOR PERFORMING CONTROL BASED ON DETECTION OF USER'S SIGHT LINE

CROSS-REFERENCE TO RELATED APPLICATION

This application is a continuation of application Ser. No. 17/115,156, filed Dec. 8, 2020, the entire disclosure of which is hereby incorporated by reference.

BACKGROUND OF THE INVENTION

Field of the Invention

The present invention relates to techniques for controlling an approach detection and a sight line detection.

Description of the Related Art

There is a technique of detecting the user's sight line and accepting an input according to the sight line. Japanese Patent Laid-Open No. 2017-120272 discloses a method of saving an electric power by determining whether or not the user's sight line is on the backside display unit and controlling the driving/stopping of the eye approach detection unit depending on the presence or absence of the sight line. Japanese Patent Laid-Open No. 2003-198889 discloses a method of saving an electric power by performing a display control of an optical viewfinder and a display unit for confirming a captured image, and performing control to turn off the display unit when eye approach detection or sight line detection is made.

In Japanese Patent Laid-Open Nos. 2017-120272 and 2003-198889, when a sensor for approach detection and a sensor for sight line detection are arranged close to each other, light emitted from each sensor (sensor light) may affect each other, resulting in erroneous detection and the like.

SUMMARY OF THE INVENTION

The present invention has been made in consideration of the aforementioned problems, and realizes techniques for preventing a sensor light for approach detection and a sensor light for sight line detection from affecting each other.

In order to solve the aforementioned problems, the present invention provides an electronic apparatus comprising: an eye approach detection unit configured to detect an objective approaching to a finder; a sight line detection unit configured to detect a sight line position to a display unit that is arranged in the finder; and a control unit configured to perform control to drive the sight line detection unit and stop driving the approach detection unit when it is detected by the approach detection unit that an objective has been approached to the finder, wherein the control unit performs control to, based on a detection result of the sight line detection unit, drive the approach detection unit from a state in which a driving of the approach detection unit is stopped, and stop driving the sight line detection unit while driving the approach detection unit.

In order to solve the aforementioned problems, the present invention provides a method of controlling an electronic apparatus that has an eye approach detection unit configured to detect an objective approaching to a finder, and a sight line detection unit configured to detect a sight line position to a display unit that is arranged in the finder, the method comprising: performing control to drive the sight line detection unit and stop driving the approach detection unit when it is detected by the approach detection unit that an objective has been approached to the finder; and performing control to, based on a detection result of the sight line detection unit, drive the approach detection unit from a state in which a driving of the approach detection unit is stopped, and stop driving the sight line detection unit while driving the approach detection unit.

In order to solve the aforementioned problems, the present invention provides a non-transitory computer-readable storage medium storing a program for causing a computer to execute a method of controlling an electronic apparatus that has an eye approach detection unit configured to detect an objective approaching to a finder, and a sight line detection unit configured to detect a sight line position to a display unit that is arranged in the finder, the method comprising: performing control to drive the sight line detection unit and stop driving the approach detection unit when it is detected by the approach detection unit that an objective has been approached to the finder; and performing control to, based on a detection result of the sight line detection unit, drive the approach detection unit from a state in which a driving of the approach detection unit is stopped, and stop driving the sight line detection unit while driving the approach detection unit.

Further features of the present invention will become apparent from the following description of exemplary embodiments (with reference to the attached drawings).

BRIEF DESCRIPTION OF THE DRAWINGS

FIG. 6A illustrates a relationship between an eyeball image and a distance to the eyeball according to the second embodiment.

DESCRIPTION OF THE EMBODIMENTS

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Multiple features are described in the embodiments, but limitation is not made an invention that requires all such features, and multiple such features may be combined as

First Embodiment

Hereinafter, embodiments in which an electronic apparatus of the present invention is applied to a digital camera which is an image capture apparatus capable of shooting a still image and/or a moving image will be described in detail with reference to the accompanying drawings.

<Apparatus Configuration>

The configuration and functions of digital camera 100 according to the present embodiment will be described below with reference to FIGS. 1A, 1B and 2.

Figure 1A:
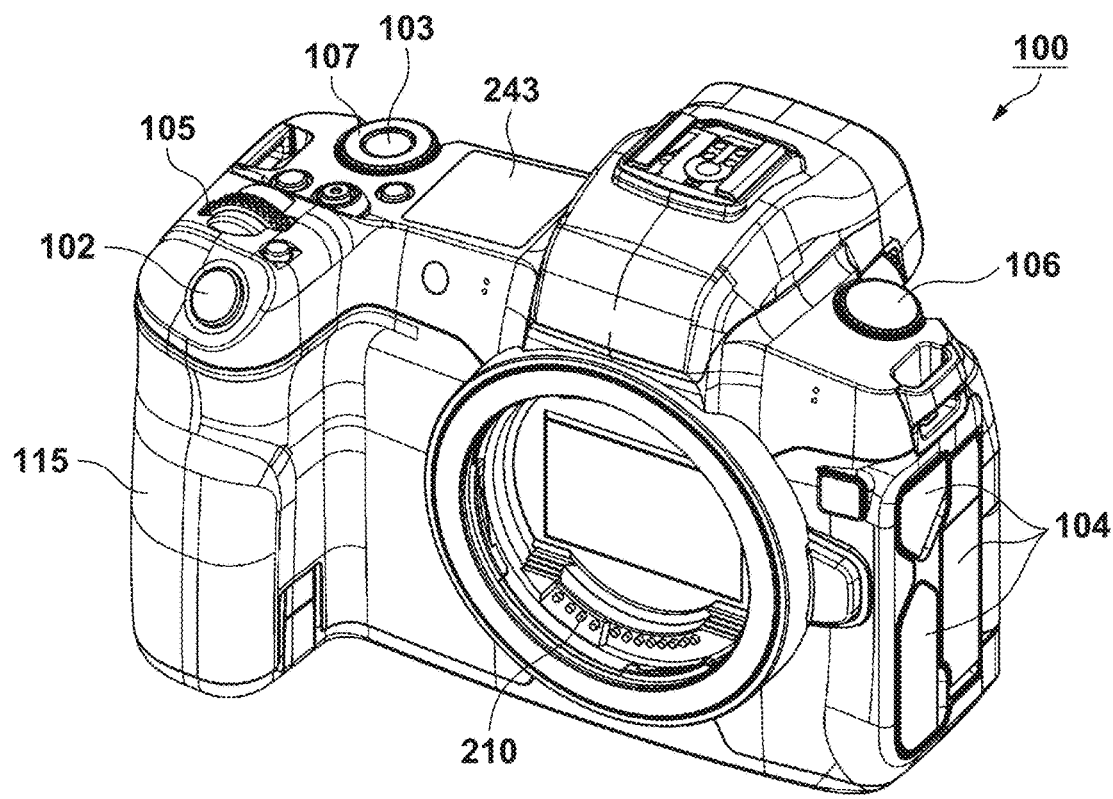
FIG. 1A is a front perspective view of an apparatus of first and second embodiments.
Figure 1B:
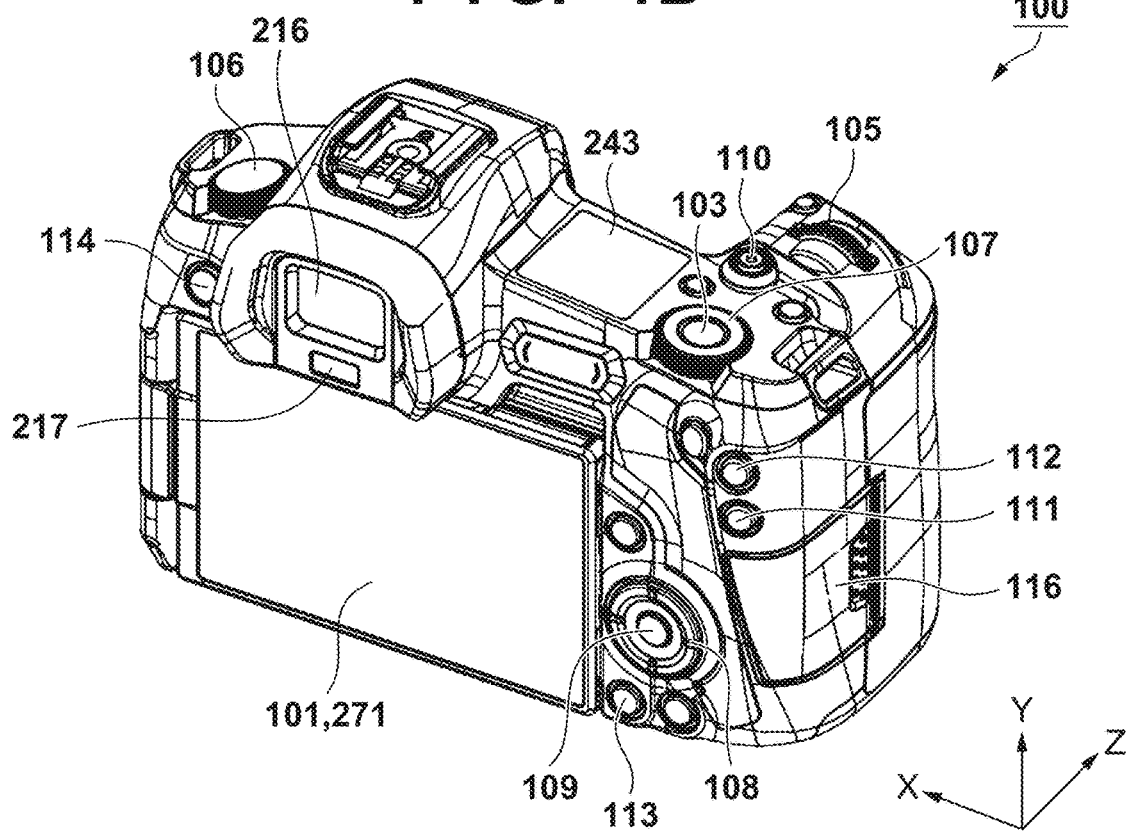
FIG. 1B is a back perspective view of the apparatus of the first and second embodiments.

FIG. 1A is a front perspective view of the digital camera 100, and FIG. 1B is a back perspective view of the digital camera 100.

In FIGS. 1A and 1B, a backside display unit 101 is a display device, such as a liquid crystal panel or an organic EL panel, provided on the back surface of the camera body, for displaying images and various types of information so that a user can visually recognize them. Moreover, the backside display unit 101 has a function of reproducing a still image after the still image was shot, a function of displaying a moving image that is being recorded, and a live view display (through-the-lens display) function as well. A touch panel (touch screen) 271 is provided on the backside display unit 101. The touch panel 271 is a touch detection device that can detect a contact (touch operation) on the display surface of the backside display unit 101 (operation surface of the touch panel 271). An out-of-finder display unit 243 is a display device such as an LCD provided on the upper surface of the camera body, and displays various setting values of the camera such as a shutter speed and a diaphragm aperture.

A shutter-release button 102 is a push button type operation member for giving a shooting instruction. A mode selection switch 103 is a dial type operation member for switching between various modes. The mode selection switch 103 switches the operation mode of a system control unit 201 to any of a still image shooting mode, a moving image recording mode, and a reproduction mode. The still image shooting mode includes an automatic shooting mode, an automatic scene determination mode, a manual mode, aperture-priority AE mode (Av mode), shutter-priority AE mode (Tv mode), and program AE mode (P mode), for example. The still image shooting mode also includes various scene mode each of which scene-specific shooting setting is made, custom mode, and the like.

Using the mode selection switch 103, the mode is directly switched to any of the plurality of modes included in the still image shooting mode. Alternatively, it is also possible to switch, using the mode selection switch 103, to the still image shooting mode and then to switch, using another operation member, to any of the plurality of modes included in the still image shooting mode. Similarly, also the moving image recording mode and the reproduction mode may include a plurality of modes.

A terminal cover 104 is a cover member for protecting a connector (not illustrated) for connecting an external device and the digital camera 100 via a cable such as a USB cable. A main electronic dial 105 is a rotating operation member included in operation units 270 that will be described later with reference to FIG. 2, and by rotating this main electronic dial 105, setting values such as a shutter speed and a diaphragm aperture can be changed.

A power supply switch 106 is an operation member for the switching on/off of the power supply to the digital camera 100. A sub electronic dial 107 is a rotating operation member that can move a selected frame, scroll images, and the like. A cross key 108 is a movement instruction member that can perform, by one of four-directional buttons constituted by UP, DOWN, LEFT and RIGHT being pressed down, an operation that corresponds to the pressed portion of the cross key 108. A SET button 109 is a push button type operation member that is mainly used for determining a selection item. A video recording button 110 is a push button type operation member that is used for switching on/off of the live view display in the still image shooting mode and for starting or stopping the moving image shooting (recording) in the moving image recording mode. An enlargement button 111 is a push button type operation member that is used for turning on/off of the enlargement display during the live view and for changing the enlargement ratio during the enlargement display. Further, the enlargement button 111 is used for enlarging a reproduced image in a reproduction mode and increasing a magnification ratio. By operating the main electronic dial 105 after turning on of the enlarged display, the live view image can be enlarged or reduced. In the reproduction mode, the reproduced image is enlarged, and the main electronic dial 105 functions as an enlargement button for increasing an enlargement ratio. An AE lock button 112 is a push button type operation member that can fix an exposure state by being pressed in a shooting standby state. The reproduction button 113 is a push-button type operation member that is used to switch between the shooting mode and the reproduction mode. By pressing the reproduction button 113 during the shooting mode, the operation mode is switched to the reproduction mode, and the latest image among the images recorded on a recording medium 250 can be displayed on the backside display unit 101. A menu button 114 is a push button type operation member for displaying a menu screen on which various settings can be made on the backside display unit 101 when pressed. The user can intuitively perform various settings using the menu screen displayed on the backside display unit 101, the cross key 108, and the SET button 109.

The display of the backside display unit 101 and an in-finder display unit 229 described later are controlled by the system control unit 201 as an electronic view finder (hereinafter referred to as EVF) in accordance with the various operation modes described above.

An eyepiece part 216 is a look-through type eyepiece finder. The user can visually recognize an image displayed on the in-finder display unit 229 via the eyepiece part 216, and confirm the focus and composition of the object image taken in through the lens unit 200.

An eye approach detection unit 217 is arranged near the eyepiece part 216, and can detect approach of any object to the eyepiece part 216. As the eye approach detection unit 217, for example, an infrared proximity sensor is used.

Figure 2:
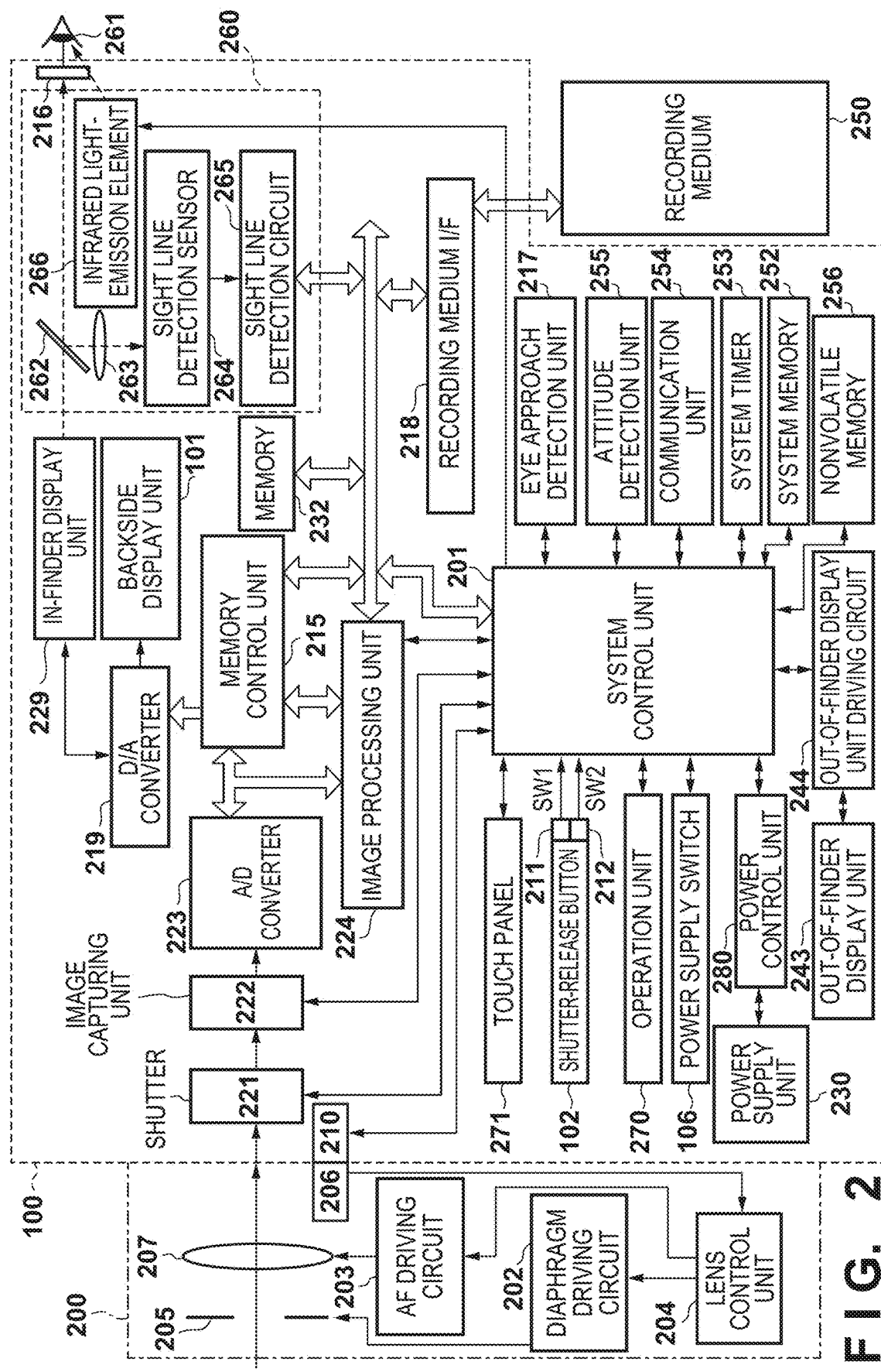
FIG. 2 is a block diagram showing an apparatus configuration of the first and second embodiments.

A communication terminal 210 is an electric contact for the digital camera 100 to perform communication with a lens unit 200 (FIG. 2). A lid 116 is a member for opening or closing a slot for mounting/removing the recording medium 250 to/from the digital camera 100. A grip portion 115 has a shape that makes it easy to be grasped by a user's a right hand when he or she holds the digital camera 100. The shutter-release button 102 and the main electronic dial 105 are arranged at positions where the grip portion 115 can be operated by the index finger of the right hand while holding the digital camera 100 by gripping the grip portion 115 with the little finger, the ring finger and the middle finger of the right hand. In the same state, the sub electronic dial 107 is arranged at a position operable with the thumb of the right hand.

Next, the internal configuration of the digital camera 100 and lens unit 200 according to the present embodiment will be described with reference to FIG. 2. In FIG. 2, configurations that are the same as in FIGS. 1A and 1B are denoted by the same reference signs.

In FIG. 2, the lens unit 200 is equipped with a shooting lens 207, and is detachable from the digital camera 100. The shooting lens 207 is usually constituted by a plurality of lenses, but is simplified here and is shown by one lens only. A communication terminal 206 is an electric contact for the lens unit 200 to perform communication with the digital camera 100. The communication terminal 210 is an electric contact for the digital camera 100 to perform communication with the lens unit 200. The lens unit 200 performs communication with the system control unit 201 via the communication terminal 206, and a built-in lens control unit 204 controls a diaphragm driving circuit 202 so as to drive a diaphragm aperture 205, and controls an AF driving circuit 203 so as to displace the position of the shooting lens 207, thereby bringing the object image in focus.

A focal plane shutter 221 can freely control the exposure time of the image capturing unit 222 in accordance with an instruction from the system control unit 201. The image capturing unit 222 is an image sensor constituted by an imaging element such as a CCD or a CMOS for converting the object image into electrical signals. An A/D converter 223 converts analog signals of one pixel output from the image capturing unit 222 into digital signals of, for example, 10 bits.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined calculation processing using the captured image data, and the system control unit 201 performs exposure control and focus control based on the calculation results. Thus, AF (Automatic Focus) processing, AE (Automatic Exposure) processing, and EF (flash pre-emission) processing of TTL (Through the Lens) type are performed. Furthermore, the image processing unit 224 performs predetermined calculation processing using the captured image data, and AWB (Automatic White Balance) processing of TTL type is performed on the basis of the calculation results.

A memory control unit 215 controls to exchange data between the A/D converter 223, the image processing unit 224, and the memory 232. Digital data output from the A/D converter 223 is directly written into a memory 232 via both the image processing unit 224 and the memory control unit 215 or via the memory control unit 215. The memory 232 stores the image data obtained from the image capturing unit 222 and the A/D converter 223, and image display data to be displayed on the backside display unit 101 or the in-finder display unit 229. The memory 232 has a storage capacity that is sufficient for storing a predetermined number of still images as well as moving images and audio for a predetermined time period. The memory 232 also functions as a memory for image display (video memory).

A D/A converter 219 converts the image display data stored in the memory 232 into an analog signal and supplies the backside display unit 101 or the in-finder display unit 229 with the analog signal. The image display data that was written into the memory 232 is displayed by the backside display unit 101 or the in-finder display unit 229 via the D/A converter 219. The backside display unit 101 and the in-finder display unit 229 perform display in accordance with the analog signal from the D/A converter 219. In this manner, the digital signals stored in the memory 232 are converted into analog signals, and the analog signals are successively transmitted to the backside display unit 101 or the in-finer display unit 229 so as to be displayed thereon, making it possible to perform live view (LV) display (through image display).

Various setting values of the camera such as a shutter speed and a diaphragm aperture are displayed on the out-of-finder display unit 243 via an out-of-finder display unit driving circuit 244.

A nonvolatile memory 256 is, for example, an EEPROM, which is electrically erasable and recordable. In the nonvolatile memory 256, constants and programs, for example, for operating the system control unit 201 are stored. In this context, "programs" may refer to programs for executing various flowcharts that will be described later.

The system control unit 201 has a CPU (Central Processing Unit or a MPU (Micro Processing Unit) for overall controlling the entire digital camera 100, and realizes, by executing the programs stored in the nonvolatile memory 256, the procedures of the flowchart that will be described later. The system memory 252 is, for example, a RAM and used also as a work memory where constants and variables for operating the system control unit 201, and the programs read out from the nonvolatile memory 256 are expanded. The system control unit 201 controls the memory 232, the D/A converter 219, the backside display unit 101, the in-finder display unit 229, and the like, so as to perform display control. A system timer 253 is a time measurement unit for measuring time periods for various types of controls and the time of an integrated clock.

The first shutter switch 211 and the second shutter switch 212 input the following operation instructions to the system control unit 201.

While the shutter-release button 102 provided on the digital camera 100 is being operated, that is, pressed halfway (the shooting preparation instruction), the first shutter switch 211 is turned on and generates a first shutter switch signal SW1. Upon receiving the first shutter switch signal SW1, the system control unit 201 causes the image processing unit 224 to start the AF processing, the AE processing, the AWB processing, the EF processing and the like.

When the operation of the shutter-release button 102 is completed, that is, the shutter-release button 102 is pressed fully (the shooting instruction), the second shutter switch 212 is turned on and generates a second shutter switch signal SW2. Upon receiving the second shutter switch signal SW2, the system control unit 201 starts a series of shooting processing from reading out the signal from the image capturing unit 222 to writing of image data to the recording medium 250.

The operation units 270 comprise operation members such as various switches and buttons for accepting various operations from a user, and communicating them to the system control unit 201, and include at least the following operation members: the shutter-release button 102, the mode selection switch 103, the main electronic dial 105, the power supply switch 106, the sub electronic dial 107, the cross key 108, the SET button 109, the video recording button 110, the enlargement button 111, the AE lock button 112, the reproduction button 113, and the menu button 114.

A power control unit 280 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each of the units including the recording medium 250.

A power supply unit 230 comprises a primary battery such as an alkaline battery or a lithium battery, a secondary battery such as a NiCd battery, a NiMH battery, or a Li-ion battery, or an AC adaptor. A recording medium interface (I/F) 218 is for interfacing with the recording medium 250 such as a memory card or a hard disk drive. The recording medium 250 is a recording medium such as a memory card for recording shot images, and constituted by a semiconductor memory, a magnetic disk, or the like.

A communication unit 254 is connected by a wireless antenna or a cable, and transmits and receives a video signal, an audio signal, and the like. The communication unit 254 can also connect to a wireless LAN (Local Area Network) and the Internet. The communication unit 254 can transmit image data (including a live view image) captured by the image capturing unit 222 and an image file recorded on the recording medium 250 to an external device, and can receive image data or other various information from the external device. Note that the communication unit 254 is not limited to a wireless LAN, but may use a wireless communication module such as an infrared communication, Bluetooth®, Bluetooth® Low Energy or WirelessUSB, or a wired connection device such as a USB cable, HDMI®, IEEE 1394, or the like.

An attitude detection unit 255 detects the attitude (orientation) of the digital camera 100 with respect to the gravity direction. In this case, based on the attitude detected by the attitude detection unit 255, it is possible to discriminate whether an image captured by the image capturing unit 222 has been shot by setting the digital camera 100 in the landscape or portrait direction. The system control unit 201 can add information about the orientation information corresponding to the attitude detected by the attitude detection unit 255 to the image file, and rotate and record the captured image. An acceleration sensor, gyro sensor and the like may be used as an attitude detection unit 255. The attitude detection unit 255 can also detect the movement (pan, tilt, lift, rest, etc.) of the digital camera 100 by using the acceleration sensor or the gyro sensor.

Included among the operation units 270 is also the touch panel 271 that is capable of detecting a touch operation on the backside display unit 101. The touch panel 271 and the backside display unit 101 can be constructed as a single integrated unit. For example, the touch panel 271 is constructed in such a manner that the transmittance of light will not interfere with the display presented by the backside display unit 101, and it is attached to the uppermost layer of the display face of the backside display unit 101. In addition, input coordinates on the touch panel 271 and display coordinates on the backside display unit 101 are correlated. As a result, a GUI can be constructed that makes it possible for the user to directly manipulate the screen displayed on the backside display unit 101. The system control unit 201 is capable of detecting the following touch operations and conditions performed by contacting the touch panel 271.

Newly touching of the touch panel 271 by a finger or pen which has not been in contact with the touch panel 271, that is a start of the touch (referred to as "touch-down" below).

A state in which the touch panel 271 is in contact with a finger or pen (referred to as "touch-on" below).

Movement of a finger or pen while in contact with the touch panel 271 (referred to as "touch-move" below).

Lifting of a finger or pen that has been in contact with the touch panel 271, that is, an end of the touch (referred to as "touch-up" below).

A state in which the touch panel 271 is not being touched at all (referred to as "touch-off" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that have been in contact is detected, the touch-off state is entered.

These operations/conditions and position coordinates at which the touch panel 271 is being touched by the finger or pen are communicated to the system control unit 201 through an internal bus and, based upon the information thus communicated, the system control unit 201 determines what kind of operation (touch operation) was performed on the touch panel 271. As for "touch-move", the determination can be made also for every vertical component and horizontal component with regard to the direction of movement of the finger or pen, which is moved on the touch panel 271, based upon a change in the coordinate position. Further, the system control unit 201 can determine that a slide operation (drag) has been performed if it detects a touch-move over a predetermined distance. An operation in which a finger is touched against the touch panel, swiftly moved a certain distance, and then lifted away will be referred to as a "flick". In other words, a flick is an operation in which a finger is swiftly flicked across the touch panel 271. If a touch-move with a predetermined distance or higher and a predetermined speed or higher is detected, and then a touch-up is detected, it can be determined that a flick has been performed (it can be determined that a flick was performed in succession to a drag). Furthermore, a touch operation in which the touch panel is touched at multiple locations (for example, two points) at the same time, and then the touch positions are moved closer to each other will be referred to as a "pinch-in", and a touch operation in which the touch positions are moved away from each other will be referred to as a "pinch-out". Pinch-out and pinch-in operations will be collectively referred to as "pinch operations" (or simply "pinching"). The touch panel 271 may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

The eye approach detection unit 217 detects whether an eye (an object) has approached (eye approaching) or has moved away from (eye detached) the eyepiece part 216 (approach detection). The system control unit 201 switches the backside display unit 101 and the in-finder display unit 229 between displaying (a display state)/not displaying (a non-display state) in accordance with the state detected by the eye approach detection unit 217. The system control unit 201 sets a display destination as the backside display unit 101 and sets the in-finder display unit 229 to be not displaying during non-eye approach detection at least in a case where the shooting mode and the switching of the display destination are automatic. Further, the system control unit 201 sets the display destination as the in-finder display unit 229 and sets the backside display unit 101 to be not displaying during eye approach detection.

If an object has approached, infrared light irradiated from a light emitting unit (not illustrated) of the eye approach detection unit 217 is reflected and incident on a light receiving unit (not illustrated) of the infrared proximity sensor. In accordance with an incident light amount of the infrared light received by the infrared proximity sensor, it is possible to detect an approach of some kind of physical object to the eyepiece part 216, and discriminate to what level of distance the object has gotten close to the eyepiece part 216 (an eye approaching distance). Upon detecting an approach of an object to the eyepiece part 216, the system control unit 201 can cause display of the in-finder display unit 229 to start. With this, it is possible for the in-finder display unit 229 to display without delay as much as possible when a user looks through the eyepiece part 216.

In addition, upon detecting that an object has approached within a predetermined distance with respect to the eyepiece part 216 from eye non-approaching state (no approach state), the eye approach detection unit 217 determines that an eye approaching is detected and transmits an eye approach detection notification to the system control unit 201. In addition, if an object for which an approach was detected is apart by the predetermined distance or more from an eye approaching state (approach state), the eye approach detection unit 217 determines that eye separation is detected, and an eye separation detection notification is transmitted to the system control unit 201. A threshold for detecting eye approaching and a threshold for detecting eye separation may be made different such as by providing hysteresis for example. In addition, it is assumed that, after eye approaching is detected, there is an eye approaching state until eye separation is detected. In addition, it is assumed that, after eye separation is detected, there is an eye non-approaching state until eye approaching is detected. With this, the system control unit 201 performs display control of the backside display unit 101 and the in-finder display unit 229 in response to an eye approaching state or an eye separation state detected by the eye approach detection unit 217.

Note that the eye approach detection unit 217 is not limited to an infrared proximity sensor, and another sensor may be used if it can detect an approach of an object or an eye to be deemed as an eye approaching.

The sight-line detection unit 260 includes a dichroic mirror 262, an image forming lens 263, a sight line detection sensor 264, a sight line detection circuit 265, and an infrared light-emission element 266 which follow, and detects whether or not there is a sight line of a user and also detects movement or a position of the sight line.

The infrared light-emission element 266 is a diode for emitting an infrared light for detecting a sight-line position of a user in a viewfinder screen, and irradiates the infrared light onto an eye 261 of a user toward the vicinity of the center of the eyepiece part 216. The infrared light irradiated from the infrared light-emission element 266 is reflected by the eye 261, and the reflected infrared light reaches the dichroic mirror 262. The dichroic mirror 262 has a function for reflecting on infrared light and allowing visible light to pass, and the reflected infrared light whose light path has been changed forms an image on an image capture plane of the sight line detection sensor 264 via the image forming lens 263.

The image forming lens 263 is an optical member that configures a sight line detection optical system. The sight line detection sensor 264 includes an image sensor that uses a CCD, CMOS, or the like. The sight line detection sensor 264 photoelectrically converts incident reflected infrared light into an electric signal, and outputs the electric signal to the sight line detection circuit 265. Based on the output signal from the sight line detection sensor 264, the sight line detection circuit 265 detects a sight-line position of a user from a position of a pupil or movement of the eye 261 of the user, and outputs detected information to the system control unit 201. The sight line detection sensor 264 can detect a pupil of an eye of a person, and thus, even if another object approaches or touches the eyepiece part 216, the sight line detection sensor 264 does not detect that a sight line of a person has been inputted. By this, the eyepiece part 216 has a function as a sight line operation unit, but the sight-line detection unit may be another configuration.

The sight-line detection unit 260 can detect the following information in a state where the eye has approached to the eyepiece part 216.

Detection state of at least one of the edge 161a of the pupil and the corneal reflected image (Purkinje image; P image) 161b input to the eyepiece part 216

Distance (Interval) between P images 161b input to the eyepiece part 216, an amount of change (change amount) of the distance (interval), and a direction of the change (change direction) of the distance (interval)

These pieces of information are notified to the system control unit 201 through the internal bus, and the system control unit 201 determines the eye approaching state or the eye separation state with respect to the eyepiece part 216 based on the information notified from the sight-line detection unit 260.

Note that the user can set the sight line input function of the sight-line detection unit 260 to be enabled or disabled, for example, via a menu screen.

<Control Processing>

Next, with reference to FIGS. 3 and 4, an exclusive control of the eye approach detection processing and the sight line detection processing according to the first embodiment will be described.

Hereinafter, an exclusive control of the eye approach detection processing and the sight line detection processing according to the eye separation determination based on the disappearance of the P images and the pupil edge will be described.

Figure 3A:
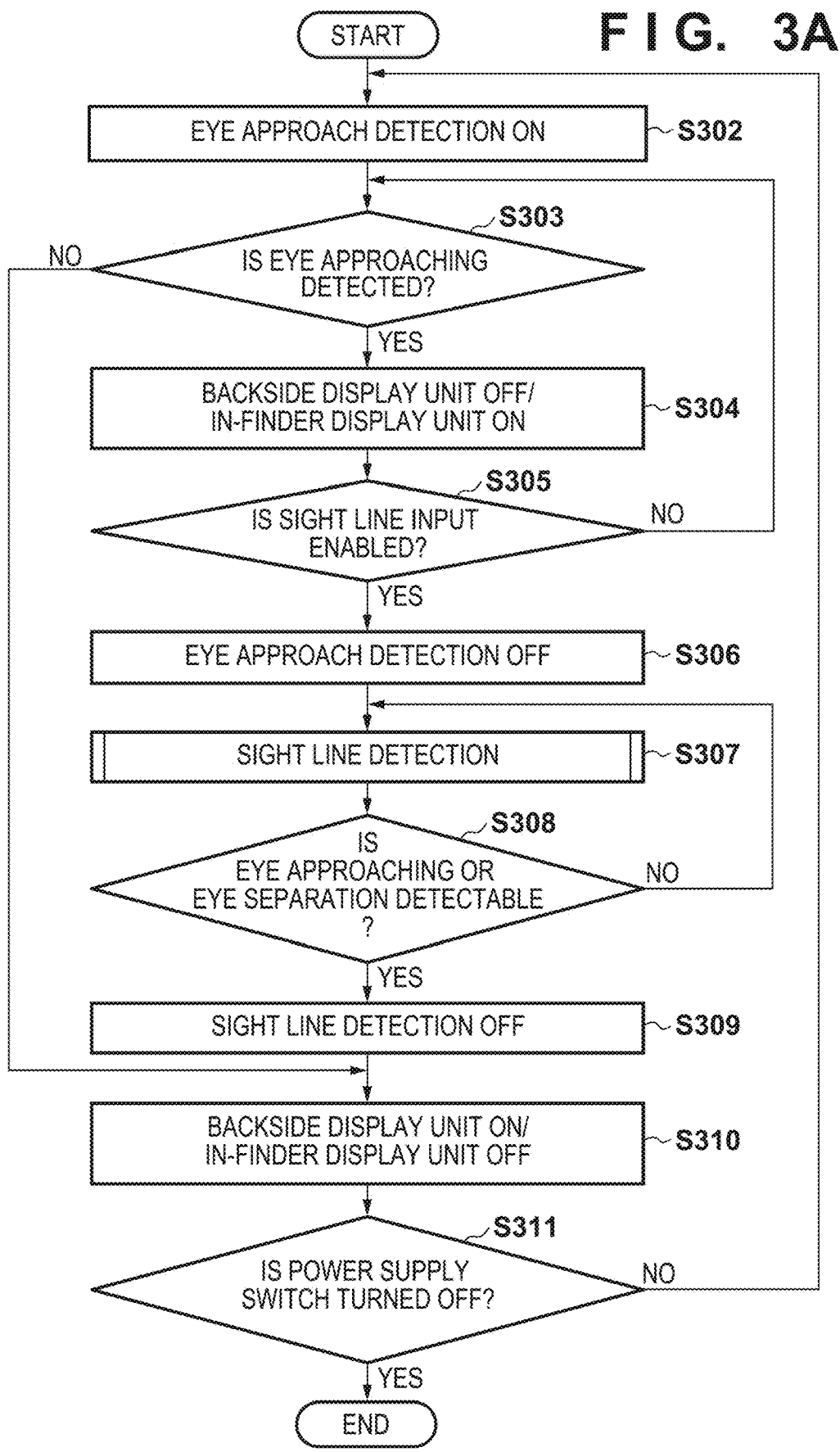
FIGS. 3A and 3B are flowcharts illustrating an exclusive control of eye approach detection processing and sight line detection processing of the first embodiment.
Figure 3B:
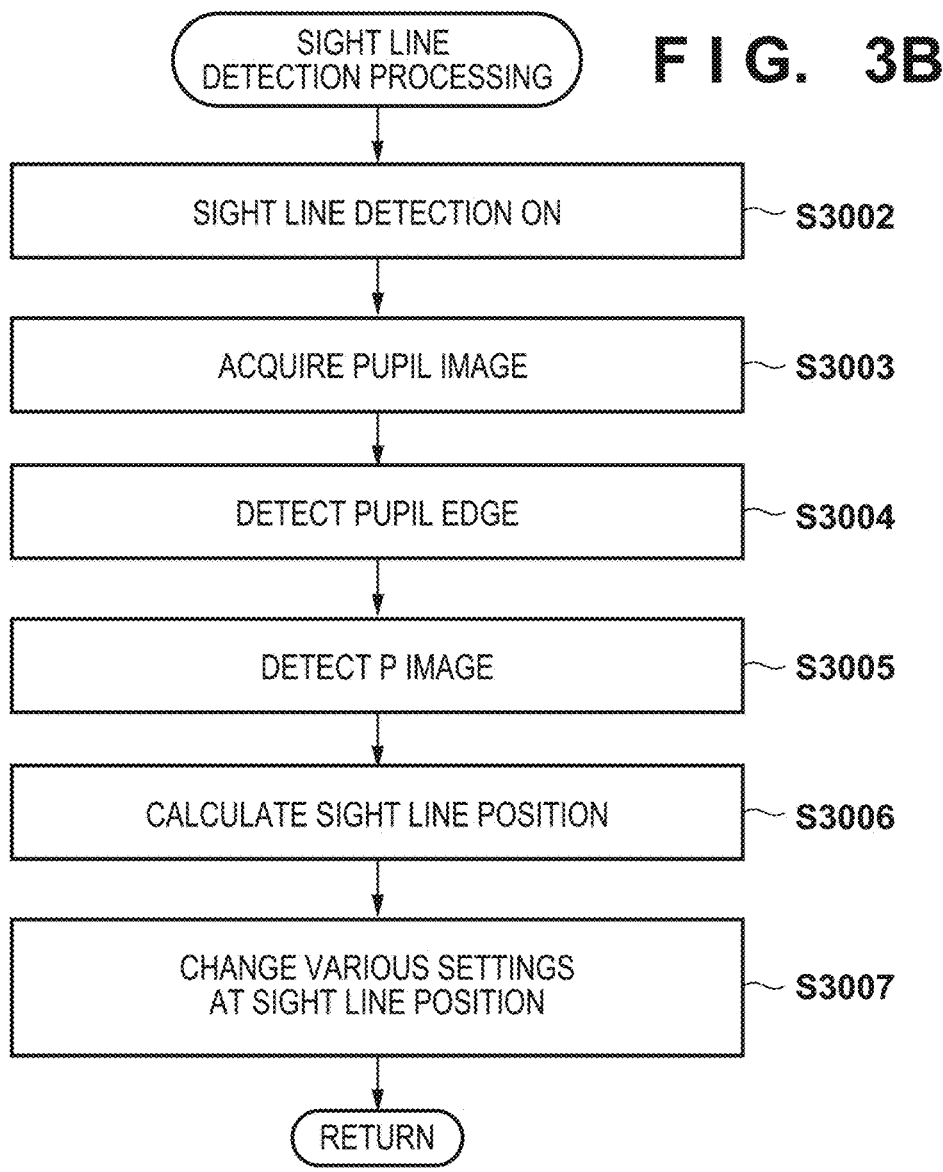

FIGS. 3A and 3B are flowcharts illustrating an exclusive control of the eye approach detection processing and the sight line detection processing in the first embodiment. The processing of FIGS. 3A and 3B is realized by the power supply of the digital camera 100 being turned on, and the system control unit 201 expanding a program stored in the nonvolatile memory 256 into the system memory 252, and executing the program to control each functional block. Further, the processing of FIGS. 3A and 3B is started when the power supply of the digital camera 100 is turned on.

In FIG. 3A, in step S302, the system control unit 201 switches the eye approach detection unit 217 to be detectable state. The system control unit 201 allows an infrared light projecting unit of the eye approach detecting unit 217 to project an infrared light outward, and an infrared light receiving sensor to receive the infrared light reflected by the objective.

In step S303, the system control unit 201 determines whether or not the user is in the eye approaching state with respect to the eyepiece part 216 based on the detection result of the eye approach detection unit 217. The processing proceeds to step S310 when the system control unit 201 determines that the user is not in the eye approaching state, and the processing proceeds to step S304 when the system control unit 201 determines that the user is in the eye approaching state.

In step S304, the system control unit 201 stops display of (hides) the backside display unit 101, starts display of the in-finder display unit 229, and the processing proceeds to step S305.

In step S305, the system control unit 201 determines whether the sigh line input function is enabled or not. If the sigh line input function is enabled, the processing proceeds to step S306, and if the sigh line input function is not enabled, the processing returns to step S303. The user can set the sigh line input function to be enabled or disabled using the menu button 114 (on the menu screen).

In step S306, the system control unit 201 puts the eye approach detection unit 217 into a non-detection state, and stops driving the infrared light projecting unit and the infrared light receiving sensor of the eye approach detection unit 217.

As a result, when the sight line detection is performed in the next step and thereafter, the sight line detection unit 260 can be operated without the sight line detection unit 260 being affected by the infrared light emitted from the infrared light projecting unit of the eye approach detection unit 217, and therefore the erroneous detection can be prevented in the sight line detection. In addition, the electric power can be saved by stopping driving of the infrared light projecting unit of the eye approach detection unit 217.

In step S307, the system control unit 201 performs sight line detection processing. FIG. 3B is a flowchart illustrating details of the sigh line detection processing of step S307.

In step S3002, the system control unit 201 puts the sight line detection unit 260 into the detectable state. The system control unit 201 irradiates the infrared light toward the eyepiece part 216 from the infrared light-emission element 266 of the sigh line detection unit 260, drives the sight line detection sensor 264, and puts the sight line detection unit 260 into a state where the infrared light can be detected. As a result, the infrared light from the infrared light-emission element 266 reaches the eyeball of the user via the eyepiece part 216, and further infrared light reaches the sigh line detection sensor 264 via the eyepiece part 216.

Here, the P image and the pupil edge will be described with reference to FIG. 4.

Figure 4:
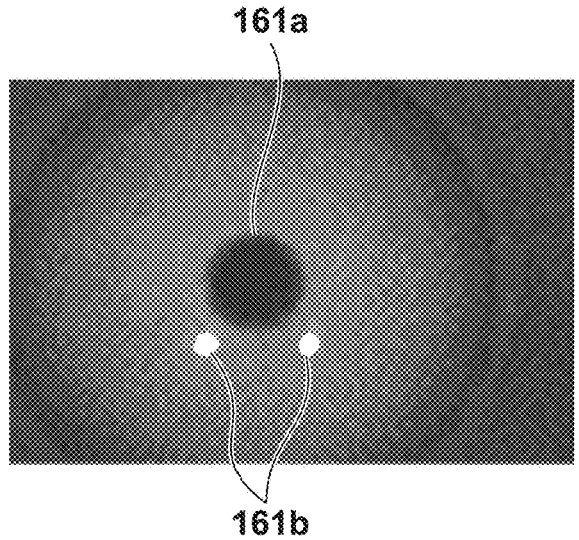
FIG. 4 illustrates an eyeball image of a person with which an infrared light is projected.

FIG. 4 illustrates an eyeball image of a person with which the infrared light is projected. On the eyeball projected with the infrared light, one or a plurality of (two in FIG. 4) bright spots called P image 161b appear as a reflection image. The pupil is a hole at the center of the iris, and the edge 161a of the pupil can be detected from the brightness difference or the defocus amount.

In step S3003, the system control unit 201 acquires the pupil image of the user by the sight line detection sensor 264 and outputs the acquired image to the sight line detection circuit 265.

In step S3004, the system control unit 201 acquires the edge 161a of the pupil of the user by the sight line detection circuit 265.

In S3005, the system control unit 201 acquires the P images 161b of the user by the sight line detection circuit 265.

In step S3006, the system control unit 201 calculates the center position of the pupil from the edge 161a of the pupil, and calculates the eye gaze position from the relationship with the P images 161b.

In step S3007, the system control unit 201 changes various settings at the sight line position and ends the sight line detection processing, and then the processing proceeds to step S308. In step S3007, various settings are changed in the shooting conditions, for example, the focus adjustment position is changed so that the camera is focused on the gaze position.

In step S308, the system control unit 201 determines whether or not the eye approach detection unit 217 has detected at least one of the edge 161a of the pupil and the P images 161b. If the eye approach detection unit 217 can detect at least one of the edge 161a and the P image 161b of the pupil, the system control unit 201 determines that the user is in the eye approaching state, and the processing returns to step S307 to continue the sight line detection, If the eye approach detection unit 217 can detect neither the edge 161a nor the P image 161b of the pupil, the system control unit 201 determines that the user is in the eye separation state, and the processing proceeds to step S309.

In step S309, the system control unit 201 puts the sight line detection unit 260 into a non-detection state. The system control unit 201 stops driving the infrared-light emission element 266 and the sight line detection sensor 264.

In step S310, the system control unit 201 drives the backside display unit 101 and stops display of the in-finder display unit 229.

In step S311, the system control unit 201 determines whether or not the power supply switch 106 is turned off by the user, and if the power supply switch 106 is still in on-state, the processing returns to step S302 to continue the detection state of the eye approach detection unit 217. If the power supply switch 106 is in off-state, the processing proceeds to step S312 and ends the processing.

As described above, according to the first embodiment, it is possible to prevent the light for detecting the eye approaching state or the eye non-approaching state and the light for detecting the sight line position from interfering with each other. In the first embodiment, the eye approaching state or the eye separation state is determined based on the output result of the sight line detection unit 260 (in the present embodiment, the edge 161a of the pupil and the presence or absence of the P images 161b). Accordingly, even if the eye approach detection unit 217 is in the non-detection state, the eye approaching state or the eye separation state can be determined, so that the eye approach detection processing and the sight line detection processing can be exclusively controlled. Then, the sight line detection sensor 264 of the sight line detection unit 260 can be operated without the sight line detection sensor 264 being affected by the infrared light emitted from the infrared light projecting unit of the eye approach detection unit 217, and therefore the erroneous detection can be prevented in the sight line detection. Further, the infrared light receiving sensor of the eye approach detection unit 217 can be operated without the infrared light receiving sensor being affected by the infrared light emitted from the infrared light emitting element 266 of the sigh line detection unit 260, and therefore the erroneous detection can be prevented in the eye approach detection. Furthermore, it is possible to obtain an electric power saving effect by exclusively controlling the eye approach detection processing and the sight line detection processing.

Second Embodiment

Next, with reference to FIGS. 5, 6A and 6B, the second embodiment will be described.

The second embodiment is a method of performing control in exclusive control of the eye approach detection processing and the sight line detection processing based on the result of determining the interval of P images and the change direction of the interval of the P images.

Figure 5:
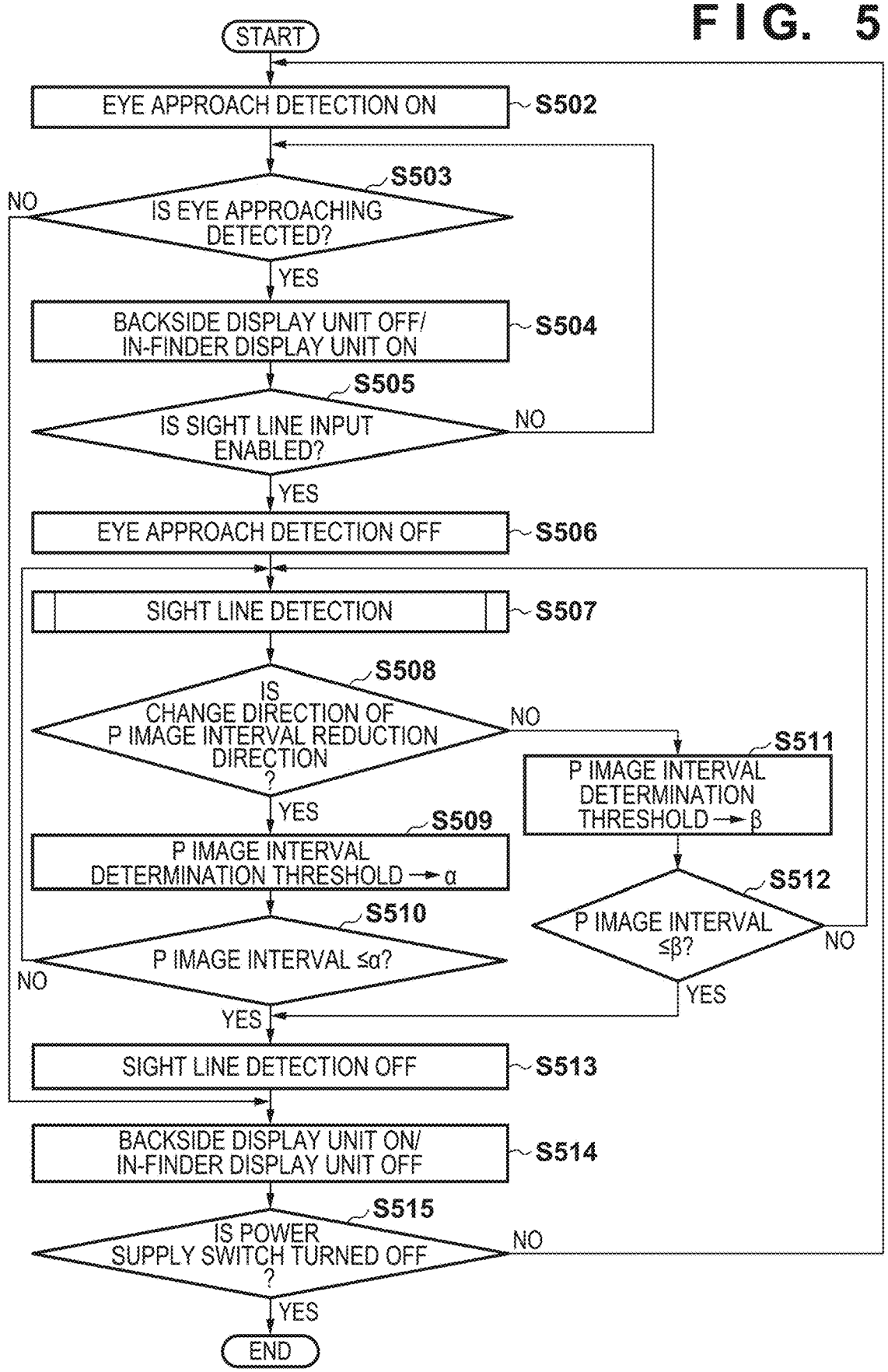
FIG. 5 is a flowchart illustrating an exclusive control of eye approach detection processing and sight line detection processing of the second embodiment.

FIG. 5 is a flowchart illustrating an exclusive control of the eye approach detection processing and the sight line detection processing in the second embodiment.

The processing of steps S502 to S507 and the processing of steps S513 to S516 of FIG. 5 are the same as the processing of steps S302 to S307 and the processing of steps S309 to S312 of FIG. 3A, and then descriptions thereof are omitted.

In step S508, the system control unit 201 obtains an amount of change per unit time in an interval between two points of the P images 161b by the sigh line detection circuit 265 calculating the amount of change per unit time in the interval between the two points of the P images 161b acquired by the sigh line detection sensor 264. When the interval between the two points of the P images 161b is other than a direction of reducing (decreasing) the interval (reduction direction of the interval) (i.e., when the distance is increased or the distance is not changed), the processing proceeds to step S509, and when the interval between the two points of the P images 161b is the reduction direction, the processing proceeds to step S511. That is, if the system control unit 201 determines that the eye of the user is away from the eyepiece part 216, the processing proceeds to step S511, and if the system control unit 201 determines that the eye of the user is not away from the eyepiece part 216, the processing proceeds to step S509.

In step S509, the system control unit 201 sets the P image interval determination threshold, that is used to determine the P image interval by the sight line detection circuit 265, to "α".

In step S510, the system control unit 201 determines whether or not the P image interval is equal to or less than the threshold α by the sight line detection circuit 265. If the P image interval is equal to or less than the threshold α, the system control unit 201 determines that the user is in the eye separation state, and the processing proceeds to step S513. If the P image interval exceeds the threshold α, the processing proceeds to step S507, and the sight line detection is continued.

In step S511, the system control unit 201 sets the P image interval determination threshold that is used to determine the P image interval by the sight line detection circuit 265, to "β".

In step S512, the system control unit 201 determines whether or not the P image interval is equal to or less than the threshold β by the sight line detection circuit 265. If the P image interval is equal to or less than the threshold β, the system control unit 201 determines that the user is in the eye separation state, and the processing proceeds to step S513. If the P image interval exceeds the threshold β, the processing proceeds to step S507, and the sight line detection is continued.

Regarding the processing of the aforementioned steps S508 to S512, a method of determining the eye separation state based on the P image interval and the change direction of the P image interval will be described with reference to FIG. 6.

Figure 6B:
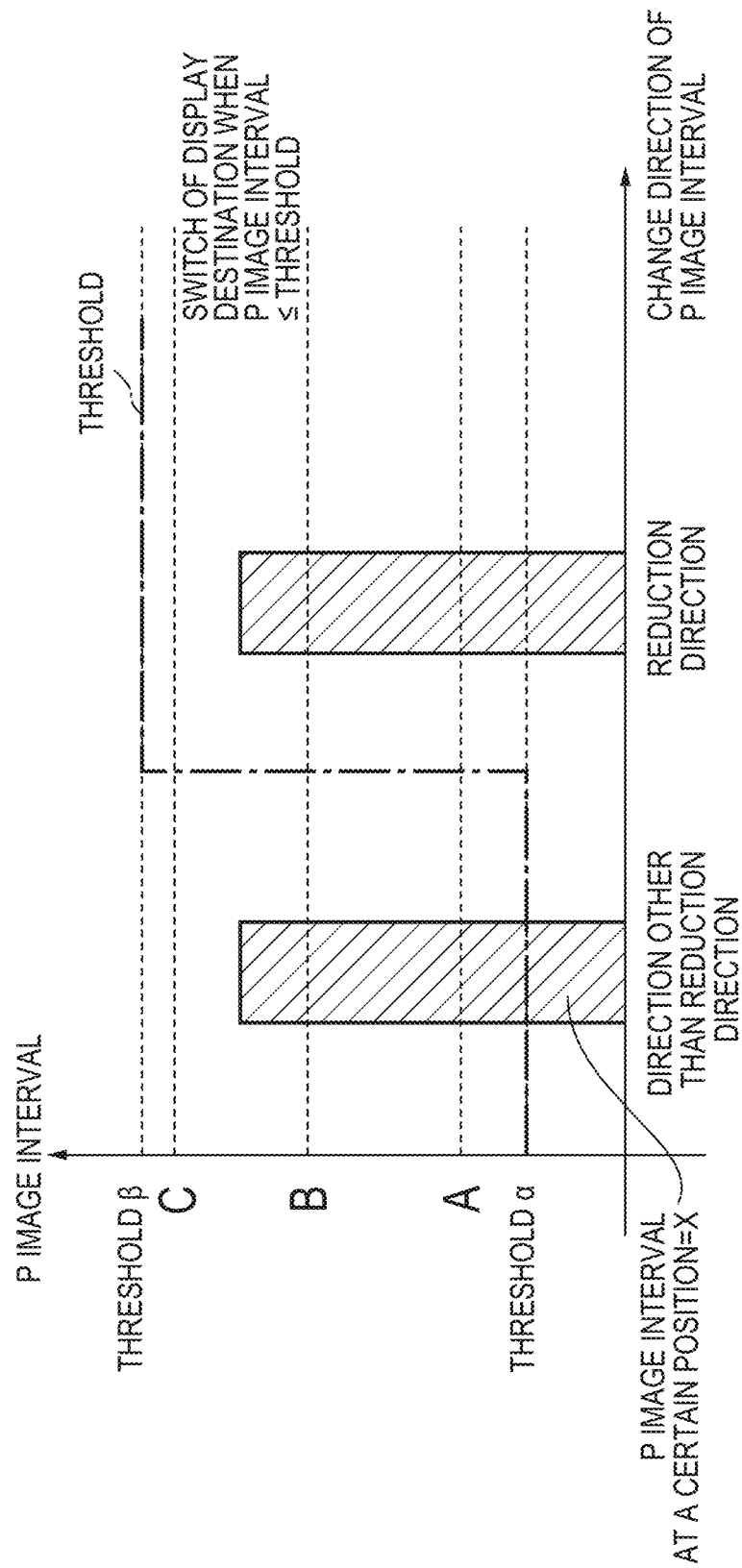
FIG. 6B illustrates a relationship between a P image interval, a change direction of the P image interval and an eye separation determination threshold according to the second embodiment.

FIG. 6A conceptually illustrates a relationship between the eyeball image and the distance of which the eyeball comes close to the digital camera 100 according to the second embodiment. FIG. 6B illustrates a relationship between the change direction of the P image interval and the eye separation determination threshold based on the P image interval according to the second embodiment.

FIG. 6A illustrates a change in the interval between P images 161b acquired by the sight line detection sensor 264 with respect to the face position of the user when the eyepiece part 216 is located at the right end in the figure. The eye approaching position (i) is a position that is 65 mm away from the eyepiece part 216 and a position boundary condition determined by the eye approach detection unit 217 to be in the eye approaching state. The distance between the P images at this position is narrow, and is assumed to be value A. The eye approaching position (iii) is a position that is 23 mm away from the eyepiece part 216, and is a position in which the user holds a part of the face in contact with the eyepiece part 216. The distance between the P images at this position is wide, and is assumed to be value C. When the intermediate position between the eye approaching position (i) and the eye approaching position (iii) is a position (ii) and the value of the distance interval of the P images is B, the magnitudes of the values have the following relationship.

Next, the eye separation determination threshold based on the P image interval with respect to the change direction of the P image interval will be described with reference to FIG. 6B. As a premise, when the P image interval is equal to or less than the threshold, it is determined to be the eye separation state. The vertical axis represents the value of the P image interval, and the horizontal axis represents the change direction of the P image interval (binary in the reduction direction and the other direction (the distance is increased or the distance is not changed)). When the face of the user is located at a certain position X between the eye approaching position (ii) and the eye approaching position (iii), the value of the P image interval is C or less and B or more. The threshold for eye separation determination is a threshold α when the P image interval is not in the reduction direction, and the reduction direction is a threshold value β. The values of the thresholds have the following relationship. $α<A$, $β>C$, that is, $α<β$.

For example, when the face of the user is at the position X and the P image interval is in a direction other than the reduction direction (the distance is increased or the distance is not changed), the threshold is α and the P image interval exceeds α, and therefore, it is determined to be the eye approaching state base on the detection result of the sight line detection unit 260. When the P image interval is in the reduction direction, the threshold is β and the P image interval is β or less, and therefore, it is determined to be the eye separation state based on the detection result of the sight line detection unit 260.

By setting the threshold α to the value A or less, it is possible to reliably determine the eye approaching state when the P image interval is in the enlargement direction other than the reduction direction.

By setting the threshold β to the value C or more, it is possible to reliably determine the eye separation state when the P image interval is reduced (decreased).

As described above, according to the second embodiment, it is possible to prevent the light for detecting the eye approaching state or the eye non-approaching state and the light for detecting the sight line position from interfering with each other. In the second embodiment, the influence of the infrared light can be reduced, and the eye approaching state or the eye separation state can be determined based on the P image interval and the change direction of the P image interval. As a result, the user's intention can be reflected in a state in which the face of the user cannot be determined only from the P images such that the face is neither near nor distant from the eyepiece part 216. In other words, it can be determined whether the user wants to look at the backside display unit 101 after separating the eye from the eyepiece part 216 or whether the user wants to maintain the eye approaching state, based on the change direction of the distance of the P images and the threshold, and the function desired by the user can be executed.

Note that the foregoing various control described as something that the system control unit 201 performs may be performed by one piece of hardware, and a plurality of pieces of hardware may distribute processing to perform control of the entirety of the apparatus.

In addition, although the present invention was explained in detail based on suitable embodiments, the present invention is not limited to these specific embodiments, and various forms of a scope that does not deviate from the gist of this invention are included in the invention. Furthermore, the above-described embodiment is merely one embodiment of the present invention, and different embodiments can be combined as appropriate.

The foregoing embodiment describes an example of a case where the present invention is applied in a digital camera. However, the present invention is not limited to this example. The present invention can be applied to an apparatus having eye approach detection function and sight line input function. In other words, the present invention can be applied in personal computers and PDAs, mobile telephone terminals and portable image viewers, printers having displays, digital photo frames, music players, game devices, e-book readers, tablet terminals, smartphones, projection apparatuses, household apparatuses, vehicle-mounted apparatuses, and so on having displays.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-223003, filed Dec. 10, 2019 which is hereby incorporated by reference herein in its entirety.

What is claimed is:

1. An electronic apparatus comprising:
an approach detection unit configured to detect an object approaching to a finder;
a sight line detection unit configured to detect a sight line position to a display unit that is arranged in the finder; and
a control unit configured to controls the sight line detection unit to be in a state in which the sight line is detectable, depending on a detection of the object approaching by the approach detection unit, and
controls the sight line detection unit to switch from the state in which the sight line is detectable to a state in which the sight line is not detected, based on a detection result of the sight line detection unit.

2. The electronic apparatus according to claim 1, wherein the control unit controls the approach detection unit to switch from a state in which the object approaching is not detectable to a state in which the object approaching is detectable, depending on a determination result of an eye separation state or an eye approaching state based on information detected by the sight line detection unit.

3. The electronic apparatus according to claim 2, wherein the control unit controls the approach detection unit to switch from the state in which the object approaching is not detectable to the state in which the object approaching is detectable, depending on the determination of the eye separation state based on the information detected by the sight line detection unit.

4. The electronic apparatus according to claim 2, wherein when the object approaching is detected by the approach detection unit, the control unit controls the approach detection unit to switch from the state in which the object approaching is detectable to the state in which the object approaching is not detectable.

5. The electronic apparatus according to claim 4, wherein when the object approaching is detected by the approach detection unit, the control unit controls the approach detection unit to switch from the state in which the object approaching is detectable to the state in which the object approaching is not detectable, based on information relating to a sight line detection by the sight line detection unit.

6. The electronic apparatus according to claim 5, wherein after the approach detection unit is switched to the state in which the object approaching is not detectable, the control unit controls the approach detection unit to switch to the state in which the object approaching is detectable, depending on a determination of the eye separation state based on information detected by the sight line detection unit.

7. The electronic apparatus according to claim 2, wherein the state in which the object approaching is not detectable by the approach detection unit is a state in which an infrared light projecting unit included in the approach detection unit is stopped to be driven.

8. The electronic apparatus according to claim 2, wherein the state in which the object approaching is not detectable by the approach detection unit is a state in which an infrared light projecting unit and an infrared light receiving sensor included in the approach detection unit is stopped to be driven.

9. The electronic apparatus according to claim 2, wherein the control unit determines the eye separation state or the eye approaching state based on a detection results relating to a pupil edge and a corneal reflection image detected by the sight line detection unit.

10. The electronic apparatus according to claim 9, wherein the control unit determines the eye separation state when the pupil edge is not detected by the sight line detection unit, and controls the approach detection unit to switch from the state in which the object approaching is not detectable to the state in which the object approaching is detectable.

11. The electronic apparatus according to claim 9, wherein the control unit determines the eye approaching state when the pupil edge is detected by the sight line detection unit, and controls the sight line detection unit to continue the state in which the sight line is detectable and controls the approach detection unit not to detect the object approaching.

12. The electronic apparatus according to claim 9, wherein the control unit determines the eye separation state when the corneal reflection image is not detected by the sight line detection unit, and controls the approach detection unit to switch from the state in which the object approaching is not detectable to the state in which the object approaching is detectable.

13. The electronic apparatus according to claim 9, wherein the control unit determines the eye approaching state when the corneal reflection image is detected by the sight line detection unit, and controls the sight line detection unit to continue the state in which the sight line is detectable and controls the approach detection unit not to detect the object approaching.

14. The electronic apparatus according to claim 9, wherein the control unit determines the eye separation state when an interval between the corneal reflection images detected by the sight line detection unit is less than a predetermined threshold, and controls the approach detection unit to switch from the state in which the object approaching is not detectable to the state in which the object approaching is detectable.

15. The electronic apparatus according to claim 9, wherein the control unit determines the eye approaching state when an interval between the corneal reflection images detected by the sight line detection unit is greater than a predetermined threshold, and controls the sight line detection unit to continue the state in which the sight line is detectable and controls the approach detection unit not to detect the object approaching.

16. The electronic apparatus according to claim 1, wherein the state in which the sight line is not detected by the sight line detection unit is a state in which an infrared light emitting element and a sight line detection sensor included in the sight line detection unit are stopped to be driven.

17. The electronic apparatus according to claim 1, wherein the control unit performs control such that when the object approaching is detected by the approach detection unit, a display of a display unit arranged in the viewfinder is turned on and a display of a first display unit arranged out of the viewfinder is turned off, and
when the sight line detection unit is switched to the state in which the sight line is not detected, the display of the display unit arranged in the viewfinder is turned off and the display of the first display unit arranged out of the viewfinder is turned on.

18. A method of controlling an electronic apparatus that as an approach detection unit configured to detect an object approaching to a finder; and a sight line detection unit configured to detect a sight line position to a display unit that is arranged in the finder; the method comprising:
controlling the sight line detection unit to be in a state in which the sight line is detectable, depending on a detection of the object approaching by the approach detection unit, and
controlling the sight line detection unit to switch from the state in which the sight line is detectable to a state in which the sight line is not detected, based on a detection result of the sight line detection unit.

19. A non-transitory computer-readable storage medium storing a program for causing a computer to execute a method of controlling an electronic apparatus that as an approach detection unit configured to detect an object approaching to a finder; and a sight line detection unit configured to detect a sight line position to a display unit that is arranged in the finder; the method comprising:
controlling the sight line detection unit to be in a state in which the sight line is detectable, depending on a detection of the object approaching by the approach detection unit, and
controlling the sight line detection unit to switch from the state in which the sight line is detectable to a state in which the sight line is not detected, based on a detection result of the sight line detection unit.

* * * * *